United States Patent
Kuźmicz et al.

(10) Patent No.: US 12,014,153 B1
(45) Date of Patent: Jun. 18, 2024

(54) METHOD AND APPARATUS FOR IMPLEMENTING ON CHIP QUANTUM RANDOM NUMBER GENERATOR USING BETA DECAY

(71) Applicant: RANDAEMON sp. z o.o., Warsaw (PL)

(72) Inventors: Wiesław Bohdan Kuźmicz, Warsaw (PL); Jan Jakub Tatarkiewicz, San Diego, CA (US)

(73) Assignee: RANDAEMON SP. Z O.O., Warsaw (PL)

( * ) Notice: Subject to any disclaimer, the term of this patent is extended or adjusted under 35 U.S.C. 154(b) by 0 days.

(21) Appl. No.: 18/201,000

(22) Filed: May 23, 2023

Related U.S. Application Data

(60) Provisional application No. 63/430,240, filed on Dec. 5, 2022.

(51) Int. Cl.
  *G06F 7/58* (2006.01)
  *G06N 10/40* (2022.01)
  *H04L 9/08* (2006.01)

(52) U.S. Cl.
  CPC ............ *G06F 7/588* (2013.01); *G06N 10/40* (2022.01); *H04L 9/0852* (2013.01); *H04L 9/0869* (2013.01); *H04L 2209/12* (2013.01)

(58) Field of Classification Search
  CPC ................................ G06F 7/588; G06N 10/40
  See application file for complete search history.

(56) References Cited

U.S. PATENT DOCUMENTS

| | | | |
|---|---|---|---|
| 3,445,591 | A | 5/1969 | Koehler |
| 3,546,356 | A | 12/1970 | Graybill |
| 3,790,768 | A | 2/1974 | Chevalier |
| 4,527,798 | A | 7/1985 | Siekierski |
| 4,855,690 | A | 8/1989 | Dias |
| 4,905,176 | A | 2/1990 | Schulz |
| 5,570,307 | A | 10/1996 | Takahshi |
| 5,627,894 | A | 5/1997 | Albert |
| 5,732,138 | A | 3/1998 | Noll |
| 5,987,483 | A | 11/1999 | Edelkind |
| 6,249,009 | B1 | 6/2001 | Kim |
| 8,001,054 | B1 | 8/2001 | Peart |
| 6,346,700 | B1 | 2/2002 | Cunningham |
| 6,415,309 | B1 | 7/2002 | Shilton |
| 6,430,170 | B1 | 8/2002 | Saints |
| 6,539,410 | B1 | 3/2003 | Klass |
| 6,542,014 | B1 | 4/2003 | Saito |
| 6,687,721 | B1 | 2/2004 | Wells |
| 6,697,829 | B1 | 2/2004 | Shilton |

(Continued)

FOREIGN PATENT DOCUMENTS

WO 2014080272 A1 5/2014

OTHER PUBLICATIONS

B. Škorić 2015 Lecture notes 2IMS10 Technical University Eindhoven (Holland) Physical aspects of digital security.

(Continued)

*Primary Examiner* — Michael D. Yaary
(74) *Attorney, Agent, or Firm* — Manuel de la Cerra

(57) ABSTRACT

A method for constructing a quantum number generator is disclosed. The method employs an electrodeposited metal on a printed circuit board (PCB) or a glass container filled with tritium containing a scintillator or fluorophore, and an integrated circuit with a detector mounted on the PCB using a flip-chip methodology.

17 Claims, 6 Drawing Sheets

(56) References Cited

U.S. PATENT DOCUMENTS

| | | |
|---|---|---|
| 6,745,217 B2 | 6/2004 | Figotkin |
| 7,031,991 B2 | 4/2006 | Hars |
| 7,124,157 B2 | 10/2006 | Ikake |
| 7,476,370 B2 | 1/2009 | Mitsugashira |
| 8,001,168 B2 | 8/2011 | Tsuyuzaki |
| 8,037,117 B2 | 10/2011 | Saito |
| 9,335,972 B2 | 5/2016 | Yang |
| 10,430,161 B1 | 10/2019 | Tatarkiewicz |
| 2004/0035201 A1 | 2/2004 | Vincze |
| 2009/0165086 A1 | 6/2009 | Trichina |
| 2012/0030268 A1 | 2/2012 | Liu |
| 2015/0064047 A1 | 3/2015 | Elwha |
| 2018/0217817 A1 | 8/2018 | Gorfinkle |
| 2019/0258458 A1 | 8/2019 | Walmsley |
| 2019/0310830 A1 | 10/2019 | Tatarkiewicz |
| 2019/0347076 A1 | 11/2019 | Park |
| 2020/0065068 A1 | 2/2020 | Hekmatshoartabari |
| 2020/0092328 A1 | 3/2020 | Kim |
| 2020/0210147 A1 | 7/2020 | Lee |

OTHER PUBLICATIONS

D.F. Williams et al. 1993 Oak Ridge National Laboratory TM-12399 Recovery and Purification of Nickel-63 from HFIR-irradiated Targets.

J. von Neumann 1951 Res. Nat. Bur. Stand. Appl. Math. Series 3, 36-38 Various techniques used in connection with random digits.

M.J. Berger and S.M. Seltzer 1982 National Bureau of Standards NBSIR 82-2550 Stopping Powers and Ranges of Electrons and Positrons.

M.-M. Bé et al. 2008 Bureau International des Poids et Mesures, Sevres (France) BIPM-5 vol. 1-4 Table of Radionuclides.

NRC Personal Annual Radiation Dose Calculator https://www.nrc.gov/aboutnrc/radiation/around-us/calculator.html.

Patuleanu et al. 2017 Proc. Romanian Acad. series A, vol. 18, 389-402 True random number sequences from gamma-decay using four extraction methods.

International Search Report and Written Opinion for PCT/US2019/017748 mailed Dec. 30, 2019 (6 pages).

Jones on "True random number generators for a more secure IoT", Mar. 2016. Retrieved on [Oct. 29, 2020]. Retrieved from the Internet <https://www.techdesignforums.com/practice/technique/true-random-number-generators-for-more-secure-systems/> (Year: 2016).

S. Burri, D. Stucki, Y. Maruyama, C. Bruschini, E. Charbon and F. Regazzoni, "SPADs for quantum random number generators and U beyond," 2014 19th Asia and South Pacific Design Automation Conference (AS P-DAC), Singapore, 2014, pp. 788-794, doi: 10.1109/ASPDAC.2014.6742986. (Year: 2014).

Duggirala R., Lal A., Radhakrishnan S. (2010) Radioisotope Decay Rate Based Counting Clock. In: Radioisotope Thin-Film Powered Microsystems. MEMS Reference Shelf, vol. 6. Springer, New York, NY. https://doi.org/10.1007/978-1-4419-6763-3_7 ( Year: 2010).

Collantes et al. "Quantum Random Number Generators", 2016 Retrieved from the Internet <https://arxiv.org/pdf/1604.03304_pdf> (Year: 2016).

Rohe, "RANDy—A True-Random Generator Based On Radioactive Decay", 2003. Retrieved from the Internet <https://citeseerx.ist.psu.edu/viewdoc/download?doi=1 0.1.1.11 0.9725&rep=rep1 &type=pdf> (Year: 2003).

International Search Report in PCT/US2020/065962 dated Apr. 22, 2020 (6 pages).

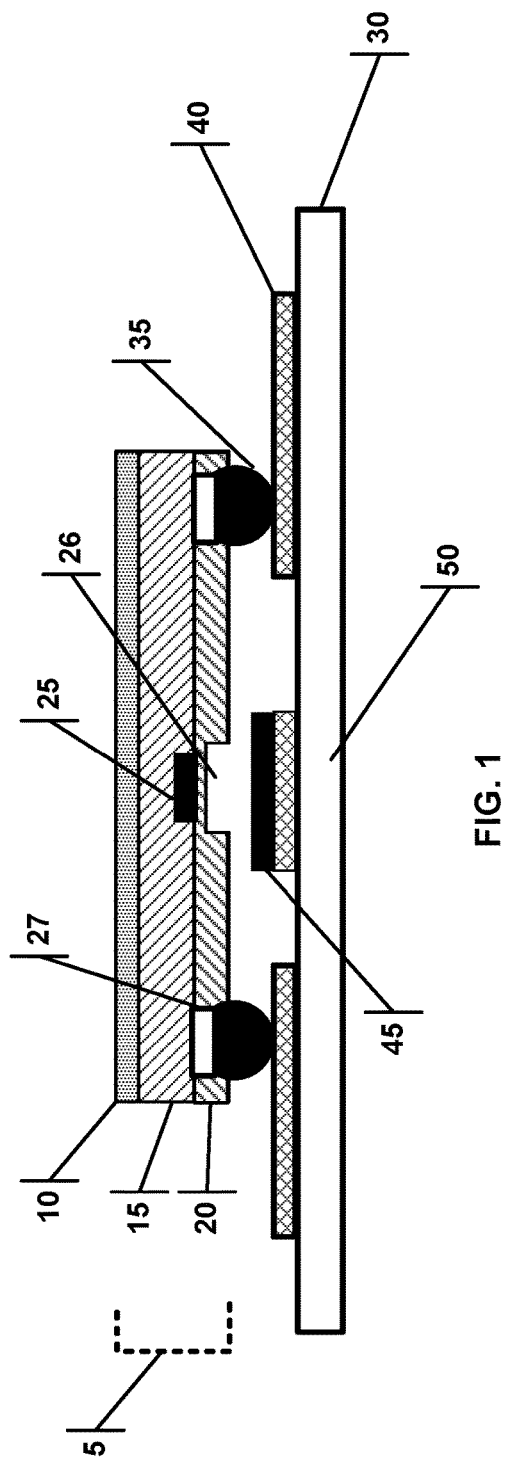
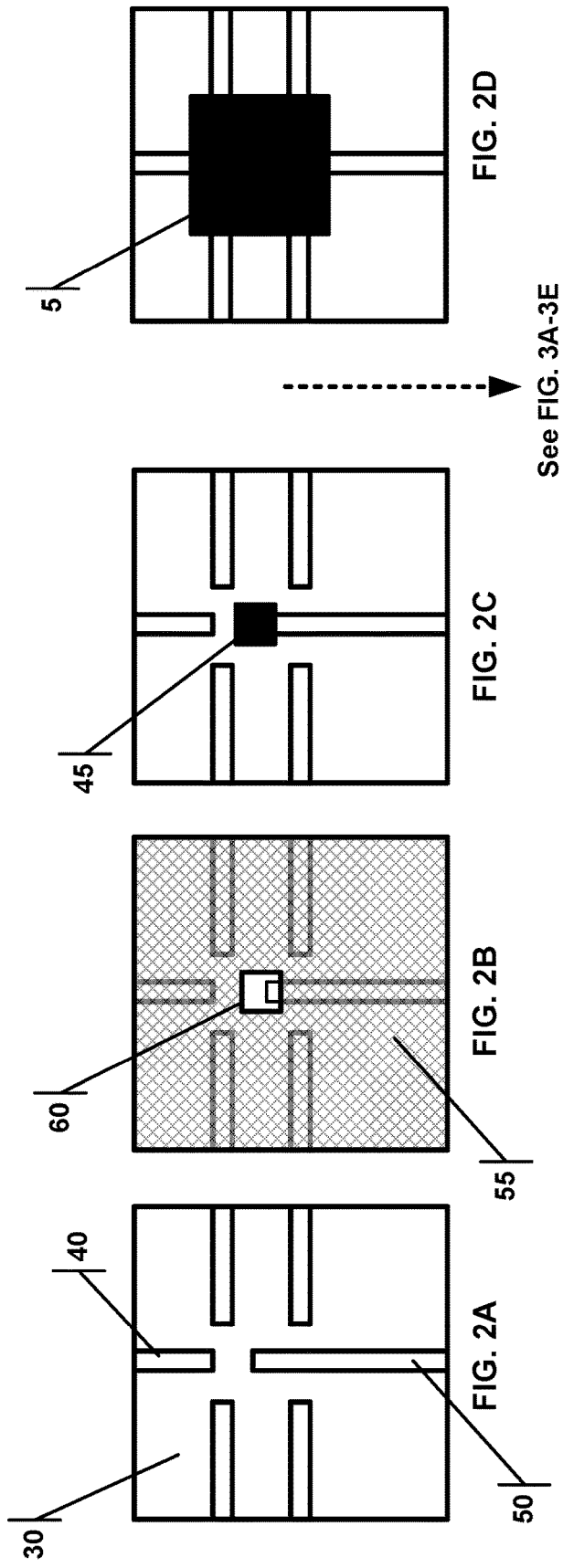

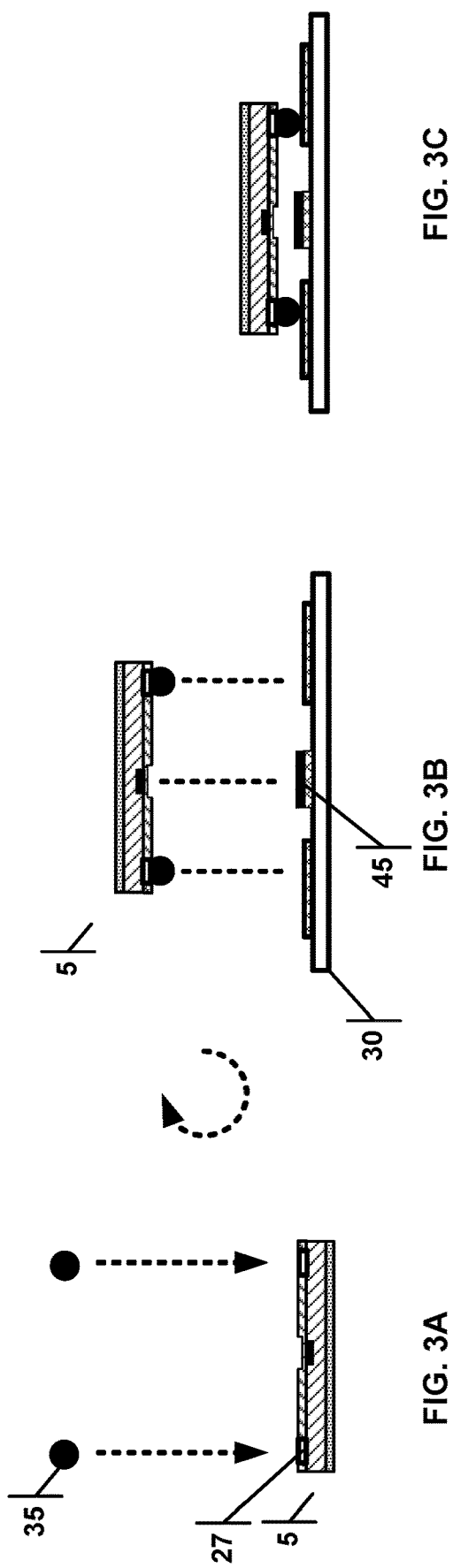

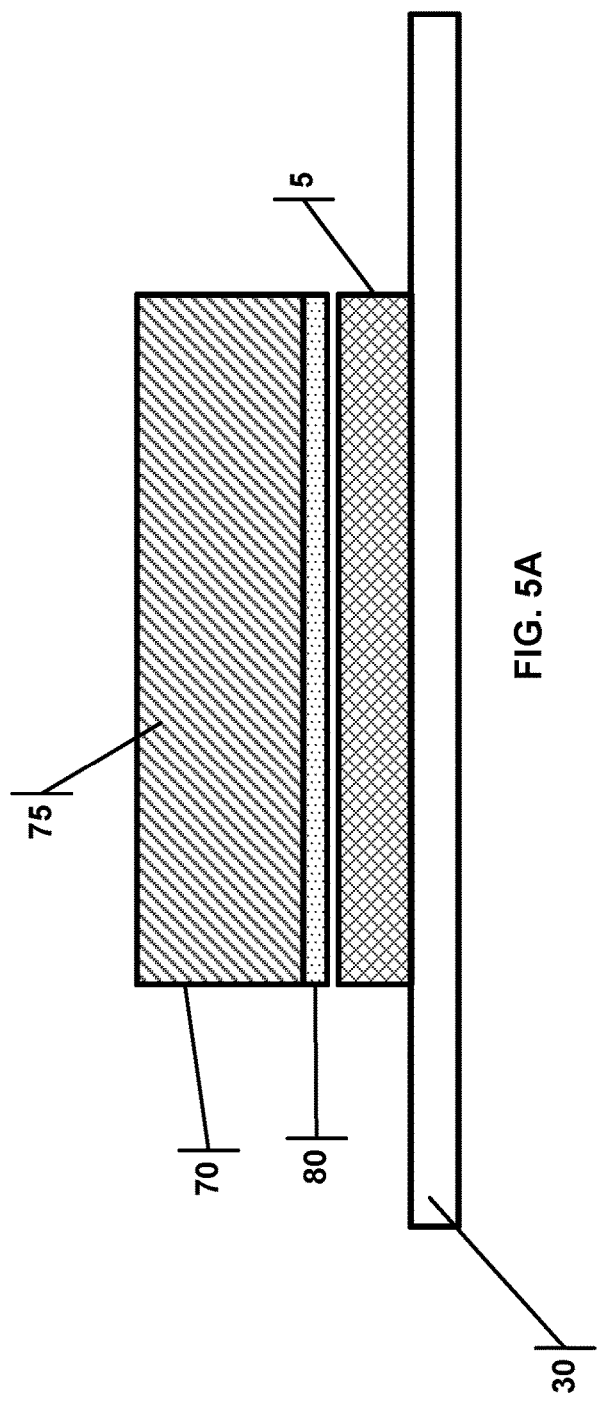
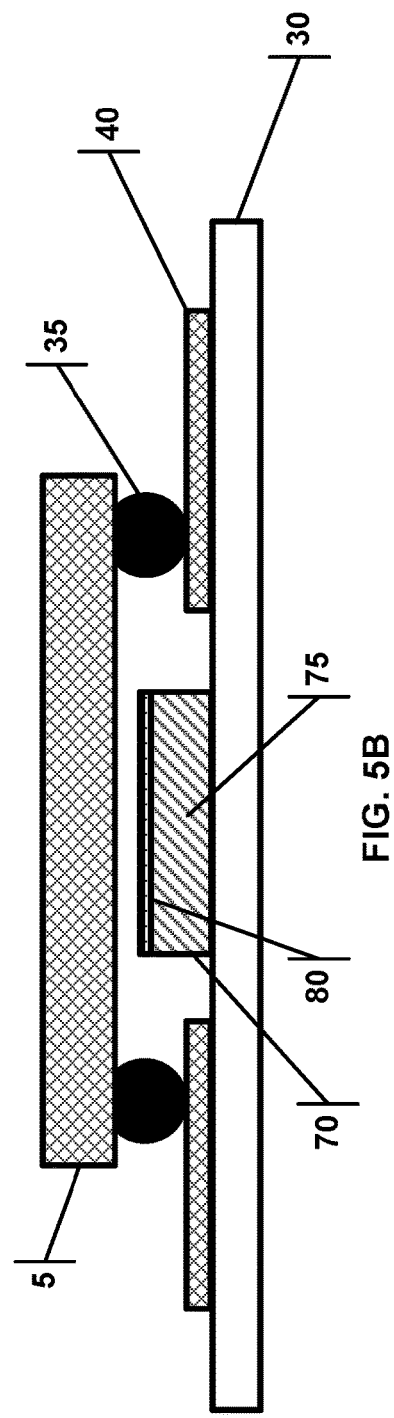

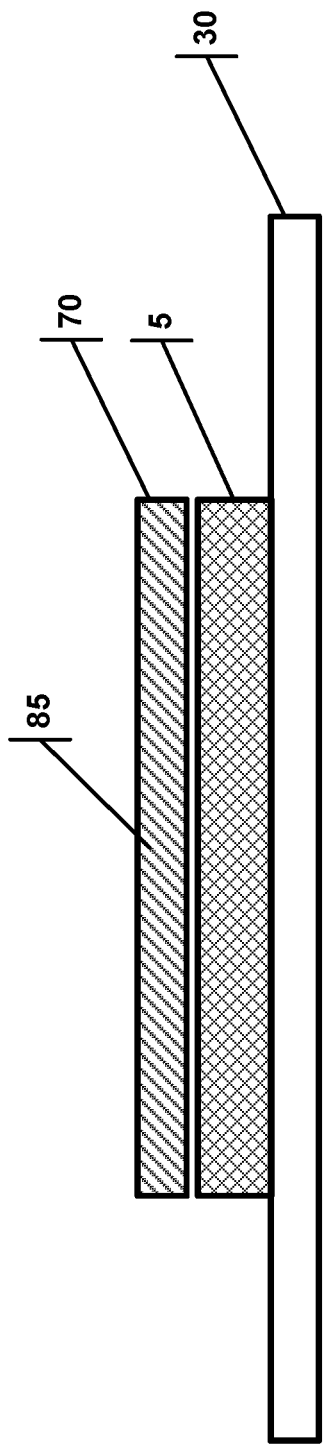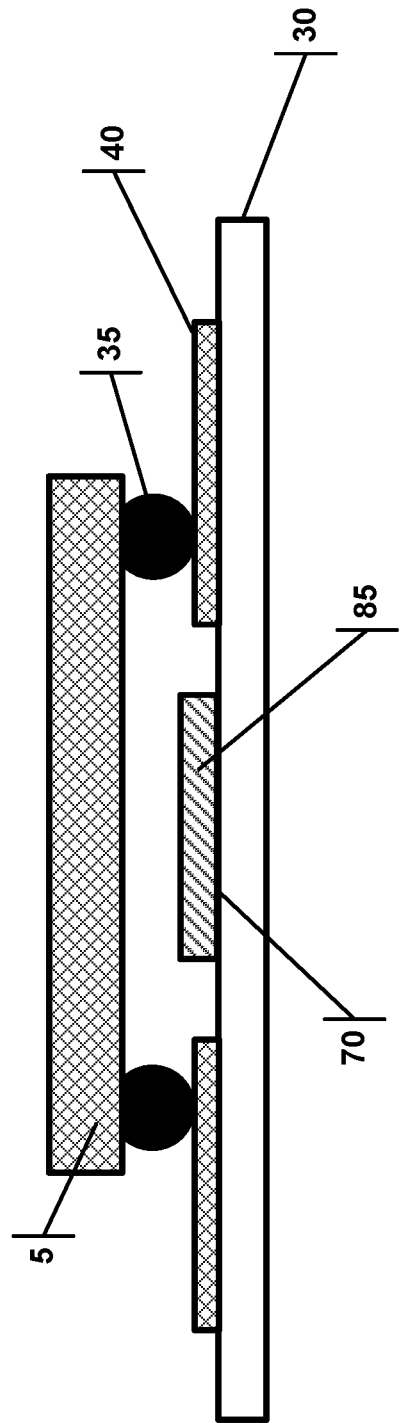

METHOD AND APPARATUS FOR IMPLEMENTING ON CHIP QUANTUM RANDOM NUMBER GENERATOR USING BETA DECAY

PRIORITY APPLICATIONS AND REFERENCES

This application claims priority to U.S. Provisional Application Ser. 63/430,240 titled "Method and Apparatus for Implementing On-Chip Quantum Random Number Generator Using Beta Decay" filed on Dec. 5, 2023, the entire contents of which is incorporated herein by reference in its entirety.

This application is further related to U.S. application Ser. No. 18/113,368 titled "Method And Apparatus For Steganographic Stream Cipher Encryption Using True Random Number Generator" filed on Feb. 23, 2023; U.S. Provisional Application Ser. 63/441,979 titled "Method and Apparatus for Steganographic Stream Cipher Encryption Using True Random Number Generator" filed on Jan. 30, 2023; U.S. application Ser. No. 17/897,138 titled "Method And Apparatus For Highly Effective On-Chip Quantum Random Number Generator" filed on Aug. 27, 2022; U.S. application Ser. No. 17/861,014 titled "Method And Apparatus For Highly Effective On-Chip Quantum Random Number Generator" filed on Jul. 8, 2022; U.S. Provisional Application Ser. 63/400,899 titled "Method and Apparatus for Highly Effective On-Chip Quantum Random Number Generator" filed on Aug. 25, 2022; U.S. Provisional Application Ser. 63/344,496 titled "Method and Apparatus for Highly Effective On-Chip Quantum Random Number Generator" filed on May 20, 2022; U.S. Provisional Application Ser. 63/279,587 titled "Method for Cost-Effective Nickel-63 Radiation Source for True Random Number Generators" filed on Nov. 15, 2021; U.S. Provisional Application Ser. 63/277,759 titled "Method for Cost-Effective Nickel-63 Radiation Source for True Random Number Generators" filed on Nov. 10, 2021; U.S. Provisional Application Ser. 63/270,912 titled "Method And Apparatus For True Random Number Generator Based On Nuclear Radiation" filed on Oct. 22, 2021; U.S. Provisional Application Ser. 63/224,811 titled "Method And Apparatus For Highly Effective Beta Decay Based On-Chip True Random Number Generator" filed on Jul. 22, 2021; U.S. Provisional Application Ser. 63/234,820 titled "Method And Apparatus For Highly Effective Beta Decay Based On-Chip True Random Number Generator" filed on Aug. 19, 2021; U.S. Provisional Application Ser. 63/235,031 titled "Method And Apparatus For Highly Effective Beta Decay Based On-Chip True Random Number Generator" filed on Aug. 19, 2021; U.S. application Ser. No. 17/687,630 titled "Method for Making Cost-Effective Nickel-63 Radiation Source for True Random Number Generators" filed on Mar. 5, 2022; U.S. application Ser. No. 17/513,661 titled "Method And Apparatus For Highly Effective Beta Decay Based On-Chip True Random Number Generator" filed on Oct. 28, 2021; U.S. application Ser. No. 17/409,971 filed on Aug. 24, 2021 titled "Method And Apparatus For Highly Effective On-Chip True Random Number Generator Utilizing Beta Decay" filed on Aug. 24, 2021; U.S. Provisional Application Ser. 62/984,528 titled "Method And Apparatus For Tritium-Based True Random Number Generator" filed on Mar. 3, 2020; U.S. Provisional Application Ser. 63/062,672 titled "Method And Apparatus For Beta Decay Based True Random Number Generator" filed on Aug. 7, 2020; U.S. Provisional Application Ser. 62/655,172 titled "Apparatus, Systems, And Methods Comprising Tritium Random Number Generator" filed on Apr. 9, 2018; U.S. Provisional Application Ser. 62/803,476 titled "Apparatus, Systems, And Methods Comprising Tritium Random Number Generator" filed on Feb. 9, 2019 now U.S. Pat. No. 10,430,161; U.S. application Ser. No. 16/273,365 titled "Apparatus, Systems, And Methods Comprising Tritium Random Number Generator" filed on Feb. 12, 2019; U.S. application Ser. No. 16/990,087 titled "Apparatus, Systems, And Methods For Beta Decay Based True Random Number Generator" filed on Aug. 11, 2020 now U.S. Pat. No. 10,901,695; U.S. application Ser. No. 17/126,265 title "Method and Apparatus for Tritium-based True Random Number Generator" filed on Dec. 18, 2020, now U.S. Pat. No. 11,048,478; U.S. application Ser. No. 17/062,307 titled "Apparatus, Systems, And Methods For Beta Decay Based True Random Number Generator" filed on Oct. 2, 2020, now U.S. Pat. No. 11,036,473; PCT Application SN PCT/US19/17748 titled "Apparatus, Systems, And Methods Comprising Tritium Random Number Generator" filed on Feb. 13, 2019; PCT Application SN PCT/US20/65962 titled "Apparatus, Systems, And Methods For Beta Decay Based True Random Number Generator" filed on Dec. 18, 2020; and PCT Application SNPCT/US20/65976 titled "Apparatus, Systems, And Methods For Beta Decay Based True Random Number Generator" filed on Dec. 18, 2020. Each of the patent applications, issued patents, and other references listed above, discussed and/or cited herein, are incorporated by reference as if fully set forth herein.

TECHNICAL FIELD

The present disclosure relates generally to cryptology, specifically using a random number generator to encrypt messages.

BACKGROUND

As opposed to pseudo-random number generators based on numerical algorithms, there are true random number generators (TRNGs) or quantum random number generators (QRNGs) devices that depend on natural random processes: multiple bipolar switches, thermal noise, light scattering by dichroic mirrors, chaotic systems, and decay of radioactive nuclei. Some of these QRNGs are listed in the provisional application to which the present application claims priority, as well as the other related applications, and those references are incorporated herein by reference as if fully set forth herein.

The decay of radioactive nuclei is considered to be the most independent on environmental influences like external magnetic and electric fields, temperature, pressure, or acceleration. However, typical nuclear-based QRNGs require a large size or number of detectors to enable the registration of particles emitted as a result of radioactive decay. Also, many nuclei used in such devices are highly radioactive and poisonous hence dangerous to humans if a device is broken.

In previous disclosures by the present inventor, a QRNG is disclosed. For example, U.S. Pat. No. 10,901,695 entitled "Apparatus, systems, and methods for beta decay based true random number generator", an array of detectors was employed and a method of adjusting counts by changing the read-out time was described. The contents of that patent are incorporated herein by reference. The source of entropy in the '695 patent was a thin layer of $^{63}$Ni attached to the inner surface of the metallic cover of the package of the integrated circuit (IC). Likewise in U.S. Pat. No. 11,281,432 entitled "Method and apparatus for true random number generator based on nuclear radiation", an array of detectors was employed to detect electrons (i.e., entropy) from the radiation source. Further, the '432 patent disclosed a method of adjusting the counting rates of these detectors based on the varying diameter of their surface. The disclosed method is very effective in compensating for the limited (finite area) radiation source. However, designing and manufacturing such a detector array is complicated because the typical electrical parameters of a single diode vary considerably with the area. The contents of both the '695 and '432 patents are incorporated herein by reference.

Another solution is described in U.S. patent application Ser. No. 17/861,014 titled "Method and Apparatus for Highly Effective On-chip Quantum Random Number Generator" filed on Jul. 8, 2022, and discloses a true random number generator that includes a CMOS matrix detector with a top surface exposed. A shell is positioned over the top surface and the shell includes a radiation source and a luminophore or scintillator constructed to emit photons toward the top surface when the luminophore or scintillator is struck by electrons from the radioactive decay of the source of the radiation. The CMOS or SPAD detector matrix is constructed to detect the photons emitted from the luminophore or scintillator and to produce a signal for the detected photons. The signal is communicated to a processor that produces true random numbers based on the signal from the detected photons.

Described herein are yet other novel and improved designs, including manufacturing techniques for such designs.

SUMMARY

Disclosed herein is a method of constructing a quantum random number generator (QRNG). The method includes: (A) providing an integrated circuit (IC) comprising a detector aligned with a detector window, and further comprising a plurality of chip pads; (B) providing a printed circuit board (PCB) with PCB pads and a ground pad; (C) applying solder bumps to the chip pads or the PCB pads; (D) masking the PCB to expose the ground pad through a mask window; (E) applying a current to the ground pad; (F) adhering $^{63}$Ni onto the ground pad through electrodeposition; (G) removing the mask to expose all contact areas on PCB; (H) aligning the chip pads with the PCB pads, and the electrodeposited $^{63}$Ni to the detector window; and (I) heating the solder bumps to form a fixed electrical connection between the chip pads and the PCB pads.

The method may also include the step of filling between the IC and the PCB with an adhesive.

The mask window may be larger than the detector window. The detector may include a plurality of detectors and the detector window may be larger than the mask window.

An alternate method of constructing a QRNG includes (A) providing an integrated circuit (IC) comprising a detector aligned with a detector window, and further comprising a plurality of chip pads; (B) providing a printed circuit board (PCB) with PCB pads, a ground pad, and a glass container comprising tritium; (C) aligning the chip pads with the PCB pads, and the glass container to the detector window; and (D) heating the solder bumps to form a fixed electrical connection between the chip pads and the PCB pads.

The method may also include the step of filling between the IC and the PCB with an adhesive. The detector may include a plurality of detectors. The glass container may include a scintillator or a gel containing a fluorophore.

A QRNG is also disclosed that includes a glass container comprising tritium, a detector constructed to detect energy radiated from the glass container from the decay of the tritium and to produce a signal for the detected energy, an amplifier connected to the detector and constructed to amplify the signal, a filter connected to the amplifier constructed to filter the signal, and a processor connected to the filter, the processor constructed to generate a true random number based on the signal.

The glass container may include either a scintillator or a fluorophore.

The detector, amplifier, filter, and processor may be formed on an integrated circuit. The processor may generate an array of true random numbers. The amplifier may be a low noise charge-sensitive preamplifier or a pulse-shaping amplifier.

The detector may be a detector array, and the processor may be constructed to perform the following steps: (A) assigning a 0 or a 1 based on the detection from each detector in the array, and (B) generating an array of true random numbers based on step (A).

Additional aspects, alternatives, and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 1 is a cross-section view of a quantum number generator (QRNG) integrated circuit (IC) implementing a flip-chip construction.

FIG. 2A illustrates a printed circuit board (PCB) with copper connections.

FIG. 2B illustrates the PCB covered with a photolithographic mask with a mask window.

FIG. 2C illustrates a mask-free PCB with $^{63}$Ni electroplated thereon.

FIG. 2D illustrates the IC connected to the PCB through solder bumps (not shown).

FIG. 3A illustrates the placement of the solder bumps on the IC.

FIG. 3B illustrates the IC flipped and aligned with the PCB pads and the electrodeposited $^{63}$Ni.

FIG. 3C illustrates the IC aligned and placed on the PCB.

FIG. 3D illustrates heating the solder bumps to flow, thus forming a fixed electrical connection between the chip pads and the PCB pads.

FIG. 3E illustrates the filling between the IC and the PCB with an adhesive.

FIG. 5A illustrates a glass container filled with tritium gas as the radiation source for the QRNG integrated circuit and containing a scintillator or fluorophore.

FIG. 5B illustrates a glass container filled with tritiated gel mixed with fluorophore as the radiation source for the QRNG integrated circuit and further implements a flip-chip construction.

FIG. 6A illustrates a glass container filled with tritium tritiated gel mixed with fluorophore as the radiation source for the CMOS matrix of detectors.

FIG. 6B illustrates a glass container filled with tritiated gel mixed with fluorophore as the radiation source for the QRNG integrated circuit and further implements a flip-chip construction.

DETAILED DESCRIPTION OF EXAMPLE EMBODIMENTS

Figure 4B:
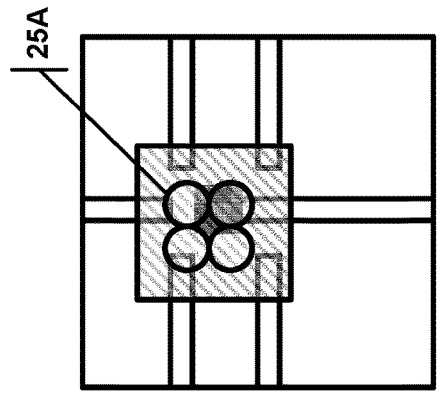
FIG. 4B illustrates the misalignment of the IC relative to the $^{63}$Ni electrodeposited on the PCB.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in a singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds to the attached figures and is provided for ease of reference, where like reference numerals designate corresponding features throughout the specification and figures:

Integrated Circuit 5
IC Cover 10
Devices and Interconnects 15
Overglass 20
Detector 25
Multiple Detectors 25A
Detector Window 26
Chip Pad 27
Printed Circuit Board 30
Solder Bump 35
Copper Connections/PCB Pad 40
Electrodeposited $^{63}$Ni 45
Large Area of $^{63}$Ni Electroplated 45A
Ground 50
Photolithographic Mask 55
Mask Window 60
Adhesive 63
IC Misalignment 65
Glass Container 70
Tritium Gas 75
Scintillator or Fluorophore 80
Tritiated Fluorophore Gel 85
Amplifier 210
Filter 215
Processor 220
Signal Processor 225
Timer 230
Memory 235
Cryptographical Client 240

The designs and techniques described herein are related to our previous published US patents and applications listed above, in which we described the general idea of using pure beta minus (electron emission) nuclear decay as a medium or source of entropy for generating true random numbers by detecting emitted electrons on the chip through an electronic sensor or array of sensors. Specifically, in U.S. Pat. Nos. 10,901,695 and 11,036,473, both entitled Apparatus, systems, and methods for beta decay based true random number generator, we disclosed quantum random number generators (QRNG) that include an enclosure defining a cavity and a cap covering the cavity. The cap's inner surface includes a thin layer of radioactive $^{63}$Ni. An electronic sensor within a cavity detects electrons from the beta decay of $^{63}$Ni and produces a signal for the detected energy. An amplifier, which is also built-in, is connected to the sensor and is constructed to amplify the signal and then feeds the signal to a filter. A built-in processor is connected to the filter and generates true random numbers based on the signals detected (time differences). This QRNG is formed as an integrated circuit.

However, such a configuration can lead to a fairly thick design, unsuitable for incorporation into miniaturized electronic devices like the Internet-of-Things (IOT) or credit cards with chips. To enable the miniaturization of the above design, we propose here implementing a flip-chip construction by electrodepositing the radiation source on the board on which such a chip is mounted. FIG. 1 illustrates an integrated circuit (IC) 5 consisting of IC cover 10, devices and interconnects 15, chip pads 27 connected to the devices and interconnects 15, and an overglass 20 with a detector window 26 that exposes a detector 25. The IC 5 is electrically bonded to a printed circuit board PCB 30 through solder bumps 35 that contact the copper connections/PCB pads 40. Under the IC 5 is an area of electrodeposited $^{63}$Ni 45 bonded to ground 50.

Electrodepositing the $^{63}$Ni to the PCB 30 can be effectively achieved by masking most of the area and leaving only the exposed part of one of the metallic connectors (ground 50). This is shown in FIGS. 2A-2D. FIG. 2A illustrates a PCB 30 with copper connections 40 and a ground 50. A photolithographic 55 mask with a mask window 60 exposing the ground 50 is then applied to the PCB 30 (FIG. 2B). Current may then be applied to the ground 50, and the $^{63}$Ni is applied and bonded to the area exposed by the mask window 60. The photolithographic mask 55 is removed, resulting in a mask-free PCB 30 with an area of electrodeposited $^{63}$Ni 45 thereon (FIG. 2C). Finally, FIG. 2D illustrates the IC 5 connected to the PCB 30 through solder bumps (not shown). It should be noted that one can also use sputtering to create micro-dots of $^{63}$Ni with the desired shape by using similar masking and applying a differential voltage to the very same ground electrode/contact.

FIGS. 3A-3E illustrate the flip-chip construction/assembly that would occur between the steps shown in FIGS. 2C and 2D. Beginning in FIG. 3A, after the IC 5 has been manufactured, solder bumps 35 are applied to the chip pads 27 (or to the PCB pads 40), then the IC 5 is flipped and aligned with the PCB pads 40 and the electrodeposited $^{63}$Ni 45 (FIG. 3B). In FIG. 3C, the aligned IC 5 is placed on the PCB 30, and in FIG. 3D heat is applied to the solder bumps 35 to flow, thus forming a fixed electrical connection between the chip pads 27 and the PCB pads 40. Finally, an adhesive may be applied to fill in between the IC 5 and the PCB 30, to adhere the structures (FIG. 3E) more firmly.

Figure 4D:
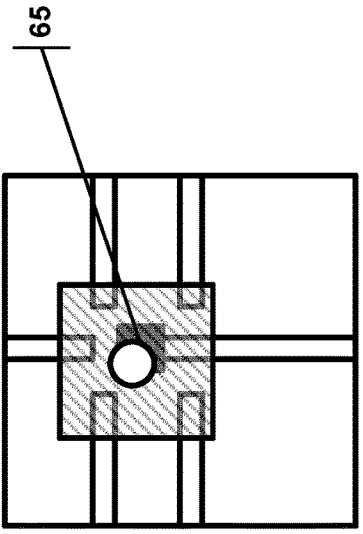
FIG. 4D illustrates the solution of using multiple detectors (shown as four) to accommodate the misalignment.
Figure 4A:
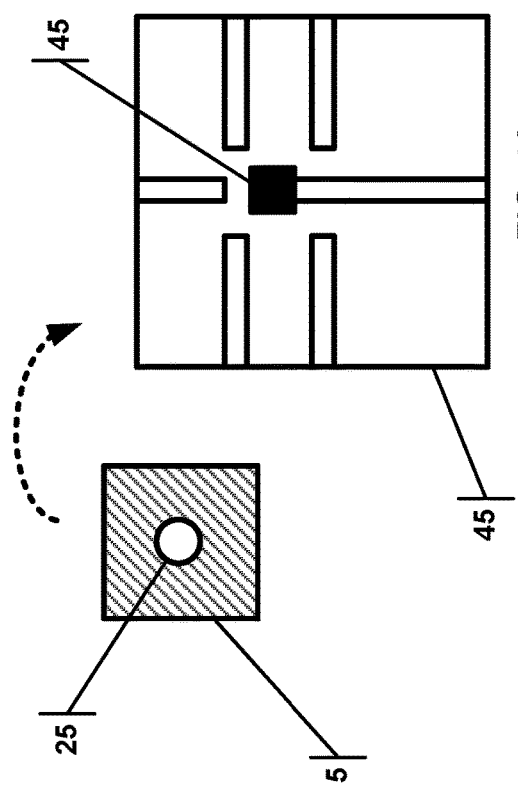
FIG. 4A illustrates the initial stage of IC placement on the PCB.

To lower the cost of $^{63}$Ni, one typically covers a smaller area. The price difference between covering 1 mm$^2$ and 0.1 mm$^2$ at present market prices of $^{63}$Ni (about \$100 k per gram) is about \$0.55, which is comparable with all the other costs of chip manufacturing. While using a smaller area (0.1 mm$^2$ corresponds to a diameter of about 360 μm), one encounters the problem of precisely placing the source over the detector. Typically, the diameter of a detector is about 100 μm thus necessitating placement of the chip with at least 200 μm accuracy, which can be difficult to achieve. This is shown in FIGS. 4A and 4B, where the IC 5 with detector 25 is installed on the PCB 30 over the electrodeposited $^{63}$Ni area 45. The IC 5 and consequently the detector 25, is misaligned (see arrow 65) with the PCB 30. This misalignment 65 will reduce the efficiency of the QRNG, by reducing the amount of electron flux detected by the IC.

Figure 4C:
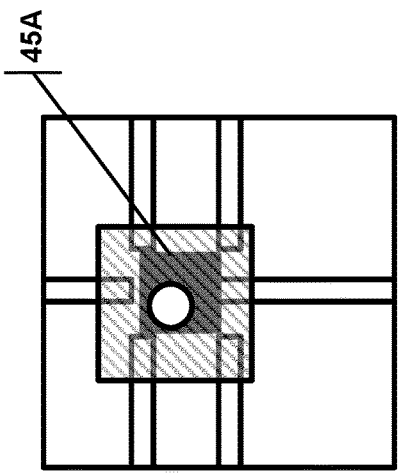
FIG. 4C illustrates the solution of electrodepositing a large $^{63}$Ni area to accommodate the misalignment.

This problem has at least two solutions: FIG. 4C illustrates electrodepositing a large $^{63}$Ni area 45A to accommodate the misalignment, while FIG. 4D illustrates using multiple detectors 25A (shown as four) to accommodate the misalignment. The latter solution may be preferred because the cost of adding multiple detectors to the IC is marginal.

In case of several or many detectors used, which typically necessitates applying much thicker overglass or even lens as is the case of CMOS or SPAD matrices, electrons emitted from beta source with energies of less than 100 keV cannot traverse through such a barrier—in typical glass or plastic such electrons have range smaller than 75 μm, cf. e.g., NBSIR 82-2550 (1982) Stopping powers and ranges of electrons and positrons. However, one can deploy special scintillators used in physical experiments e.g., Saint-Gobain BC440 that very efficiently convert one electron into many photons of blue light—typically more than 400 photons per one 70 keV electron—that can be easily detected by photodiode. These scintillators are available as thin foils with a minimal thickness of about 0.5 mm, which still can be fitted in a compact design considered here. The effective thickness needed to fully absorb all electrons emitted by the source is less than 75 μm, hence commercial scintillator foils may be thinned down.

When the use of scintillators is technologically possible, one can also contemplate different types of beta sources, namely tritium that we considered in our previous U.S. Pat. No. 10,430,161 Apparatus, systems, and methods comprising tritium random number generator and U.S. Pat. No. 11,048,478 Method and apparatus for tritium-based true random number generator. Tritium with a half-life time of about 12.3 years is generating about 8× more electrons in a given period than the same number of $^{63}$Ni nuclei (half-life time 98.7 years). Because tritium is a gas, emitted electrons have much larger ranges inside radioactive material even though the maximum energy for electrons emitted by tritium is about 17 keV while the maximum energy emitted by $^{63}$Ni is 67 keV. Comparison: 67 keV electron has a range of about 13 μm in metallic nickel which is also the thickness of the active layer of $^{63}$Ni (electrons from the deeper layers of $^{63}$Ni foil cannot escape and thus do not contribute to externally measured activity) while 10 keV electron emitted by tritium has a range of 12.8 mm in hydrogen gas, cf. NBSIR 82-2550 (1982) Stopping powers and ranges of electrons and positrons or about 1000× larger because the density of hydrogen gas (about 0.84*10$^{-4}$ g/cm$^3$) is about 100,000× smaller than the density of metallic nickel (about 8.9 g/cm$^3$). The ratio of nuclear charge numbers, which also influences these ranges, between tritium and nickel is 1:28 or rather large. All above-listed differences result in maximum tritium surface activity of about 600 mCi/cm$^2$ assuming that the tritium gas source is kept in a container of about 13 mm inner thickness or more (with factor ½ already included since electrons are being emitted in two opposite directions perpendicularly to the surface) while maximum surface radioactivity of $^{63}$Ni is about 15 mCi/cm$^2$ for foil thicknesses larger than about 14 μm. The number of decaying atoms in such layers depends on the molecular density of the materials considered: 6 g/mol for tritium and 63 g/mol for nickel. The huge difference in surface activity between tritium and $^{63}$Ni makes it tempting to use a tritium source confined within a glass container together with a scintillator or fluorophore (electrons cannot penetrate the container with thick walls—the glass container with very thin walls of less than 75 μm being impractical for manufacturing) as depicted in FIGS. 5A and 5B. A glass container 70 filled with tritium gas 75 is positioned above an IC 5 mounted to a PCB 30 as shown in FIG. 5A. Alternatively, in FIG. 5B a flip chip construction is used and the IC 5 is mounted over a glass container 70 filled with tritium gas 75, where the IC 5 is in electrical communication with the PCB 30 through solder bumps 35. In both constructions, within the glass container 70, there is a scintillator or fluorophore 80.

To get the same surface radioactivity as for $^{63}$Ni i.e., 15 mCi/cm$^2$, the inner thickness of the container with tritium needs to be just 0.35 mm thick (with the applied correction of 710/512=1.39 as presented in FIG. 5 of our U.S. Pat. No. 11,249,725 Method and apparatus for highly effective on-chip true random number generator utilizing beta decay), still within the tight specs considered in this application even if 0.5 mm of the scintillator is added. With a thinner scintillator, the thickness of the whole system can be lowered to 0.425 mm.

One should consider the possibility of using tritiated gel or plastic as discussed in our patent U.S. Pat. No. 11,048,478 Method and apparatus for tritium-based true random number generator. Surface radioactivity of such materials, presumably containing many hydrogens that can be replaced with tritium like in polyethylene, is not very high because of electron self-absorption discussed above—the range of 10 keV electrons in polyethylene is about 2.5 μm, making the active layer very thin indeed. However, many plastics are exhibiting phosphorescence which can make the effective thickness much larger when photons instead of electrons are detected. A preferred solution is depicted in FIGS. 6A and 6B. A tritiation of a special, translucent gel mixed with a fluorophore 85 that can be placed in a thin glass container 70 near detectors on the IC 5 mounted to the PCB 30 (FIG. 6A). Alternatively, in FIG. 6B a flip chip construction is used and the IC 5 is mounted over a glass container 70 filled with tritiated fluorophore gel 85, where the IC 5 is in electrical communication with the PCB 30 through solder bumps 35.

Such thin glass containers, their inner surfaces covered with a fluorophore, are routinely manufactured and used for illumination of watches, sights, or even knives (GTLS—Gaseous Tritium Light Source https: en.wikipedia.org wiki Tritium_radioluminescence), cf. e.g., patents U.S. Pat. No. 9,921,034 Sight device, U.S. Pat. No. 11,364,645 Illumination of folding knives for safe operation in the dark and U.S. Pat. No. 10,386,158 Light source with a gas-tight hollow body. The problem in our application with these types of tritium light sources stems from the time needed to emit photons after the electron excites the molecule (radioluminescence). For pure illumination purposes, the emission time can be very long (broad pulse of electrons in time), making the flux of the photonic source constant in time. However, in our application, photons must be emitted in a very short time (burst light pulses) to not overlap with subsequent events and to allow the detection of the electron emission time point precisely—e.g., in physical experiments, when the detection and separation of single electrons is important, scintillators like BC440 mentioned before, with a decay time of about 2 ns are used. This should be compared with microseconds or even milliseconds decay times for typical fluorophores. The use of a special fluorophore with a very short decay time that can be mixed with tritiated gel is critical for the application of the described technology in QRNG design.

Figure 7:
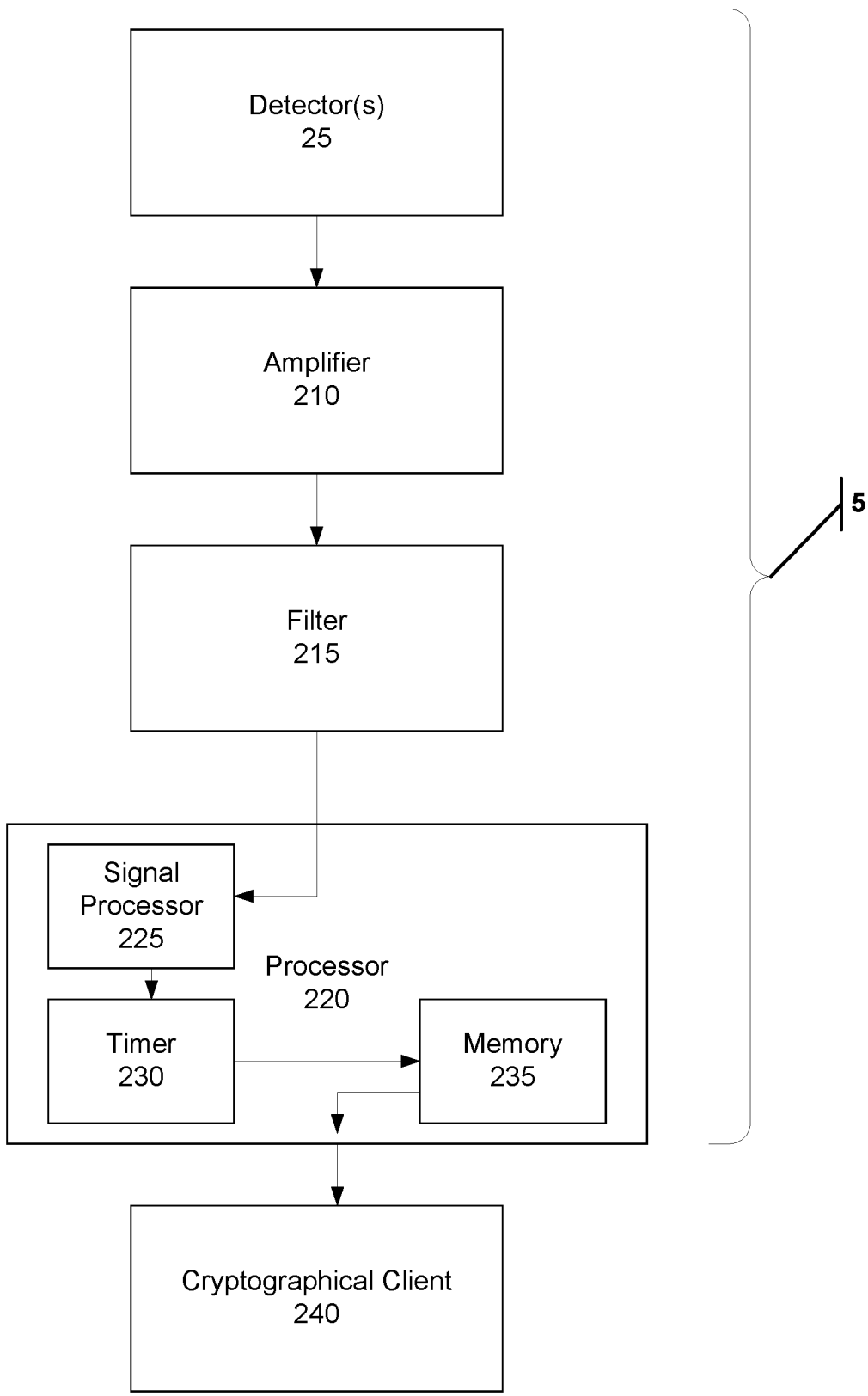
FIG. 7 is a flow diagram of the various components that may be placed on the integrated circuit.

The detector 25 may be included on an IC 5, which may further include an amplifier 210 (such as a low noise charge-sensitive preamplifier and pulse shaping amplifier), a filter 215, and processor 220, as shown in FIG. 7. A cryptographical client 240 may optionally also be on the IC 5. Instead of using a single detector, and as discussed above, the IC 5 may include an array of detectors, akin to a typical CCD or CMOS optical matrix. For example, the IC 5 may have a detector 25A with a 10×10 array, capable of producing a 100-bit number in a single scan. Random numbers may be generated directly from this array. Processor 220 could assign a 1 or 0 based on the signal received from each detector in the array (electron hit or not); those values can be strung together to generate an array of true random numbers. The process is like randomly dropping sand grains on the checkerboard. This is described and shown in more detail in U.S. Pat. No. 10,901,695, incorporated by reference herein.

Any of the suitable technologies, materials, and designs set forth and incorporated herein may be used to implement various example aspects of the invention as would be apparent to one of skill in the art.

While operations may be depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements, and variations can be made without departing from the scope and spirit of this invention, based on what is described and illustrated in this patent document.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A method of constructing a quantum random number generator (QRNG), the method comprising:
   providing an integrated circuit (IC) comprising a detector aligned with a detector window, the detector constructed to detect energy radiated from a decay of radioactive material and to produce a signal for the detected energy upon which a random number may be generated, and further comprising a plurality of chip pads;
   providing a printed circuit board (PCB) with PCB pads and a ground pad;
   applying solder bumps to the chip pads or the PCB pads;
   masking the PCB to expose the ground pad through a mask window;
   applying a current to the ground pad;
   adhering the radioactive material comprised of $^{63}$Ni onto the ground pad through electrodeposition;
   removing the mask;
   aligning the chip pads with the PCB pads, and the electrodeposited $^{63}$Ni to the detector window;
   heating the solder bumps to form a fixed electrical connection between the chip pads and the PCB pads.

2. The method of claim 1, wherein the mask window is larger than the detector window.

3. The method of claim 1, wherein the detector comprising a plurality of detectors and the detector window is larger than the mask window.

4. The method of claim 1 further comprising filling between the IC and the PCB with an adhesive.

5. A method of constructing a quantum random number generator (QRNG), the method comprising:
   providing an integrated circuit (IC) comprising a detector aligned with a detector window, the detector constructed to detect energy radiated from a decay of radioactive material and to produce a signal for the detected energy upon which a random number may be generated, and further comprising a plurality of chip pads;
   providing a printed circuit board (PCB) with PCB pads, a ground pad, and a glass container comprising the radioactive material comprised of tritium;
   applying solder bumps to the chip pads or the PCB pads;
   aligning the chip pads with the PCB pads, and the glass container to the detector window;

heating the solder bumps to form a fixed electrical connection between the chip pads and the PCB pads.

6. The method of claim 5, wherein the detector comprising a plurality of detectors.

7. The method of claim 5, further comprising: filling between the IC and the PCB with an adhesive.

8. The method of claim 5, wherein the glass container comprises a scintillator or fluorophore.

9. The method of claim 5, wherein the class container comprises a tritiated gel containing a fluorophore.

10. A quantum random number generator (QRNG) comprising:
- a glass container comprising tritium;
- a detector constructed to detect energy radiated from the glass container from the decay of the tritium and to produce a signal for the detected energy;
- an amplifier connected to the detector and constructed to amplify the signal;
- a filter connected to the amplifier constructed to filter the signal;
- a processor connected to the filter, the processor constructed to generate a true random number based on the signal.

11. The QRNG of claim 10, wherein the class container comprises a scintillator or fluorophore.

12. The QRNG of claim 10, wherein the class container comprises a tritiated gel containing a fluorophore.

13. The QRNG of claim 10, wherein the detector, amplifier, filter, and processor are formed on an integrated circuit.

14. The QRNG of claim 10, wherein the processor generates an array of true random numbers.

15. The QRNG of claim 10, wherein the amplifier comprises a low noise charge-sensitive preamplifier or a pulse shaping amplifier.

16. The QRNG of claim 10, wherein the detector is a detector array.

17. The QRNG of claim 10, wherein the processor is constructed to perform the following steps:
- a. assigning a 0 or a 1 based on the detection from each of the detectors in the array;
- b. generating an array of true random numbers based on step (a).

* * * * *